United States Patent [19]

Rosch et al.

[11] Patent Number: 5,274,702
[45] Date of Patent: Dec. 28, 1993

[54] WIDEBAND TELEPHONE LINE INTERFACE CIRCUIT

[75] Inventors: Reinhard W. Rosch, Richmond; Stanley D. Rosenbaum, Ottawa, both of Canada

[73] Assignee: Northern Telecom Limited, Montreal, Canada

[21] Appl. No.: 868,941

[22] Filed: Apr. 16, 1992

[51] Int. Cl.[5] .................................... H04M 1/00
[52] U.S. Cl. .................................. 379/399; 379/401
[58] Field of Search ............... 379/398, 399, 400, 401, 379/402, 403, 404, 340, 412, 413

[56] References Cited

U.S. PATENT DOCUMENTS

| | | |
|---|---|---|
| 4,484,032 | 11/1984 | Rosenbaum . |
| 4,539,438 | 9/1985 | Rosenbaum et al. ............... 379/413 |
| 4,563,547 | 1/1986 | Booth ................................ 379/399 |
| 4,571,460 | 2/1986 | Rosenbaum et al. ............... 379/412 |
| 4,727,574 | 2/1988 | Jakab . |
| 4,764,956 | 8/1988 | Rosch et al. . |
| 4,829,567 | 5/1989 | Moisin ............................... 379/413 |
| 4,947,427 | 8/1990 | Rosch et al. . |

Primary Examiner—James L. Dwyer
Assistant Examiner—Jack Chiang
Attorney, Agent, or Firm—R. John Haley

[57] ABSTRACT

An active impedance line interface circuit for connection to a two-wire telephone line comprises tip and ring unity gain d.c. amplifiers having outputs d.c. coupled via feed resistors to tip and ring wires respectively. Loop current and common mode current conducted via the feed resistors are monitored individually and converted to digital signals supplied to a digital control circuit, which can be programmed to provide desired operating conditions. Digital control signals produced by the control circuit are converted into analog signals and used to control currents passed by current sources through resistors at inputs of the d.c. amplifiers, thereby determining voltages at the d.c. amplifier inputs and hence on the tip and ring wires. These d.c. voltages are smoothed by capacitors used for coupling an a.c. signal to the d.c. amplifiers. The voltage control facilitates reverse battery operations without a relay, protection against faults, and adaptive adjustment of the line interface circuit to the line in dependence upon the monitored currents.

19 Claims, 3 Drawing Sheets

WIDEBAND TELEPHONE LINE INTERFACE CIRCUIT

This invention relates to line interface circuits for telecommunications lines. Line interface circuits are commonly connected to two-wire telephone subscriber lines at a telephone central office or remote terminal in order to provide a variety of well-known desired functions.

CROSS-REFERENCE TO RELATED APPLICATIONS

Reference is directed to U.S. patent application Ser. No. 07/868,893 filed simultaneously herewith in the names of Rosch et al. and entitled "Telephone Line Interface Circuit With Voltage Control", and also to U.S. patent application Ser. No. 07/868,940 U.S. Pat. No. 5,258,713 filed simultaneously herewith in the names of Rosch et al. and entitled "Impedance Generator For A Telephone Line Interface Circuit". The entire disclosure of each of these applications is hereby incorporated herein by reference.

BACKGROUND OF THE INVENTION

Various forms of line interface circuit, and various desirable features in line interface circuits, are known. In particular, it is known for example from Rosenbaum U.S. Pat. No. 4,484,032 issued Nov. 20, 1984 and entitled "Active Impedance Transformer Assisted Line Feed Circuit" to provide a line interface circuit in which two amplifiers have their outputs coupled to the tip and ring wires of a two-wire telephone line via feed resistors and primary windings of a very small transformer. In this arrangement, a secondary winding of the transformer and a resistive network coupled to the feed resistors provide for sensing of a.c. and d.c. conditions on the line.

With evolution of telephone systems, it is desirable to provide improved line interface circuits which in particular have a bandwidth which is sufficiently great to accommodate ISDN (integrated services digital network) services, for example a signal bandwidth of the order of 200 kHz. At the same time, it is desirable to provide improvements in line interface circuits with respect to such features as their size, cost, versatility, and operation especially in relation to fault conditions, common mode signal rejection, and power consumption and dissipation.

Considered generally, there is a need for a line interface circuit which can be used to operate in conjunction with any arbitrary telephone communications line to provide arbitrary voice and data communications services as may be desired at any particular time, which services can be readily changed under software control from a telephone central office processor without requiring any hardware changes of the line interface circuit.

While the line interface circuit described in U.S. Pat. No. 4,484,032 provides considerable advantages over other line interface circuits, in particular in allowing precise longitudinal balance and the use of a very small transformer facilitating improved noise performance and bandwidth which is independent of the resistance values used in the resistive network, which accordingly can be high to minimize power consumption and dissipation, nevertheless some disadvantages remain, in particular relating to noise susceptibility, a residual non-uniformity in the frequency response, and an inability to monitor common mode current separately from differential or loop current, as is desirable in a highly versatile line interface circuit. These disadvantages are discussed further in the detailed description in this specification.

In order to provide cancellation of common mode signals, and to provide a substantially constant threshold for ground fault current limiting, it is known from Rosch et al. U.S. Pat. No. 4,764,956 issued Aug. 16, 1988 and entitled "Active Impedance Line Feed Circuit" to connect a potential divider between the tip and ring wire voltage taps of the resistive network, in a transformerless line interface circuit, and to connect a d.c. amplifier to the tapping point of the potential divider. The output of the d.c. amplifier is coupled to the voltage taps via oppositely-poled parallel diodes and resistors, and the voltage taps are also coupled to a control circuit differential amplifier and to a compensating circuit differential amplifier. While such an arrangement provides some advantages in operation of the line interface circuit, each of the multiple amplifier stages contributes a phase shift, resulting in potential instability and limited bandwidth. For a wideband line interface circuit it is necessary to minimize the number of cascaded amplifier stages which are used.

In Rosch et al. U.S. Pat. No. 4,947,427 issued Aug. 7, 1990 and entitled "Protection Arrangement For A Subscriber Line Interface Circuit" there is described an arrangement for protecting a line interface circuit from faults on the line by opening contacts of an isolation relay via which the line interface circuit is connected to the line. In this arrangement, current on the line is detected, when the relay contacts are closed, by a resistive network coupled to the feed resistors, and voltage is detected on the telephone line side of the relay contacts, so that the line voltage is detected whether or not the relay contacts are closed. A capacitor is charged in dependence upon the detected line voltage during positive half-cycles, and in dependence upon the detected line current exceeding a threshold level during negative half-cycles, of an a.c. waveform on the line, and the capacitor voltage is compared with a threshold value for controlling the relay.

An object of this invention is to provide an improved line interface circuit.

SUMMARY OF THE INVENTION

According to one aspect of this invention there is provided a line interface circuit for a two-wire telecommunications line, comprising: d.c. feed means including two feed resistors and a transformer having two primary windings in series with the feed resistors for connection to the two wires of the line, respectively; current sensing means coupled to the feed resistors for providing on a pair of wires a balanced output dependent upon current flowing through the feed resistors; and two differential amplifiers in a balanced arrangement, each amplifier having an inverting input, a non-inverting input, and an output for providing a signal dependent upon differential current through the feed resistors, one of the inputs of each amplifier being d.c. coupled to a respective one of the pair of wires and the other of the inputs of each amplifier being d.c. coupled to a point of reference potential, each amplifier having d.c. and a.c. feedback paths from the output to the inverting input of the amplifier, and the inverting input of each amplifier being a.c. coupled to a respective end of a secondary winding of the transformer.

The balanced arrangement of the two differential amplifiers avoids a problem of noise due to different ground potentials being amplified in a known arrangement in which one side of the secondary winding of the transformer is grounded.

Preferably, for each amplifier, the d.c. feedback path comprises a d.c. feedback resistance between the output and the inverting input of the amplifier, the a.c. feedback path comprises an a.c. feedback resistor coupled to the output of the amplifier in series with a capacitor coupled to the inverting input of the amplifier, and the respective end of the secondary winding of the transformer is coupled to a junction between the a.c. feedback resistor and the capacitor. The capacitor then serves both to block d.c. in the a.c. feedback path and to a.c. couple the transformer secondary winding to the differential amplifier.

In order to compensate for the finite resistance of the secondary winding of the transformer and thereby remove a discontinuity in the frequency response, preferably, for each amplifier, the d.c. feedback resistance comprises a first resistor connected to the output of the amplifier in series with a second resistor connected to the inverting input of the amplifier, the capacitor is connected to a junction between the first and second resistors whereby the a.c. feedback path comprises the a.c. feedback resistor, the capacitor, and the second resistor in series, and a ratio of the resistance of the second resistor to the resistance of the first resistor is approximately equal to a ratio of half the resistance of the secondary winding of the transformer to the resistance of the a.c. feedback resistor.

Conveniently, for each amplifier, the inverting input is connected to the respective one of the pair of wires and the non-inverting input is connected to the point of reference potential.

In order to reduce common mode signals at the inputs and outputs of the two differential amplifiers, the line interface circuit preferably includes a potential divider connected between the outputs of the two differential amplifiers, a further amplifier having inverting and non-inverting inputs connected respectively to a point of reference potential and to a tapping point of the potential divider, and two resistors each connected between an output of the further amplifier and a respective one of the pair of wires. This arrangement results in the wideband differential current output, with common mode signal reduction, being subject to the phase shift of only one amplifier, providing greater bandwidth and stability than the arrangement described in U.S. Pat. No. 4,764,956 referred to above in which a differential current output is produced at the output of two cascaded amplifier stages with consequently greater phase shift.

The line interface circuit advantageously includes a resistor connected between the output of the further amplifier and a summing node, and a potential diveder arranged to be connected between the wires of the telecommunications line and having a tapping point connected to the summing node, the arrangement being such that a common mode voltage component at the output of the further amplifier is cancelled at the summing node to produce a signal representing common mode current through the feed resistors.

The line interface circuit preferably also includes switching means for coupling the telecommunications line to the d.c. feed means, the potential divider which has a tapping point connected to the summing node being connected on the line side of the switching means whereby a signal produced at the summing node when the switching means is open represents common mode voltage on the line. Thus the summing nodes serves the dual purposes of providing a signal representing only common mode current through the feed resistors when the switching means is closed, and providing a signal representing common mode voltage when the swiching means is open to interrupt the current flow, for example to protect the line interface circuit from excessive currents.

According to another aspect this invention provides a line interface circuit for a two-wire telecommunications line, comprising: d.c. feed means including two feed resistors and a transformer having two primary windings in series with the feed resistors for connection to the two wires of the line, respectively; current sensing means coupled to the feed resistors for providing an output dependent upon current flowing through the feed resistors; and differential amplifying means having an output for providing a signal dependent upon differential current through the feed resistors, an input d.c. coupled to the output of the current sensing means, a d.c. feedback path comprising a first resistor connected to the output of the amplifying means in series with a second resistor connected to an inverting input of the amplifying means, and an a.c. feedback path including an a.c. feedback resistor coupled to the output of the amplifying means in series with a capacitor coupled to a junction between the first and second resistors; wherein a secondary winding of the transformer is coupled to a junction between the a.c. feedback resistor and the capacitor, and wherein resistances of the first, second, and a.c. feedback resistors are determined in relation to a resistance of the secondary winding of the transformer to produce substantially zero voltage across the capacitor.

According to a further aspect this invention provides a line interface circuit for a two-wire telecommunications line, comprising: d.c. feed means including two feed resistors and a transformer having two primary windings in series with the feed resistors for connection to the two wires of the line, respectively; current sensing means coupled to the feed resistors for providing an output dependent upon current flowing through the feed resistors; amplifying means having an input coupled to the output of the current sensing means and to a secondary winding of the transformer and having an output providing a signal dependent upon differential current through the feed resistors; an amplifier having an input coupled to the output of the amplifying means and having an output coupled to the input of the amplifying means for reducing common mode signals at the input and output of the amplifying means; a resistor connected between the output of the amplifier and a summing node; and a potential divider arranged to be connected between the two wires of the line and having a tapping point connected to the summing node, the arrangement being such that a common mode voltage component at the output of the amplifier is cancelled at the summing node to produce a signal representing common mode current through the feed resistors.

BRIEF DESCRIPTION OF THE DRAWINGS

The invention will be further understood from the following description with reference to the accompanying drawings, in which.

DETAILED DESCRIPTION

Figure 1:
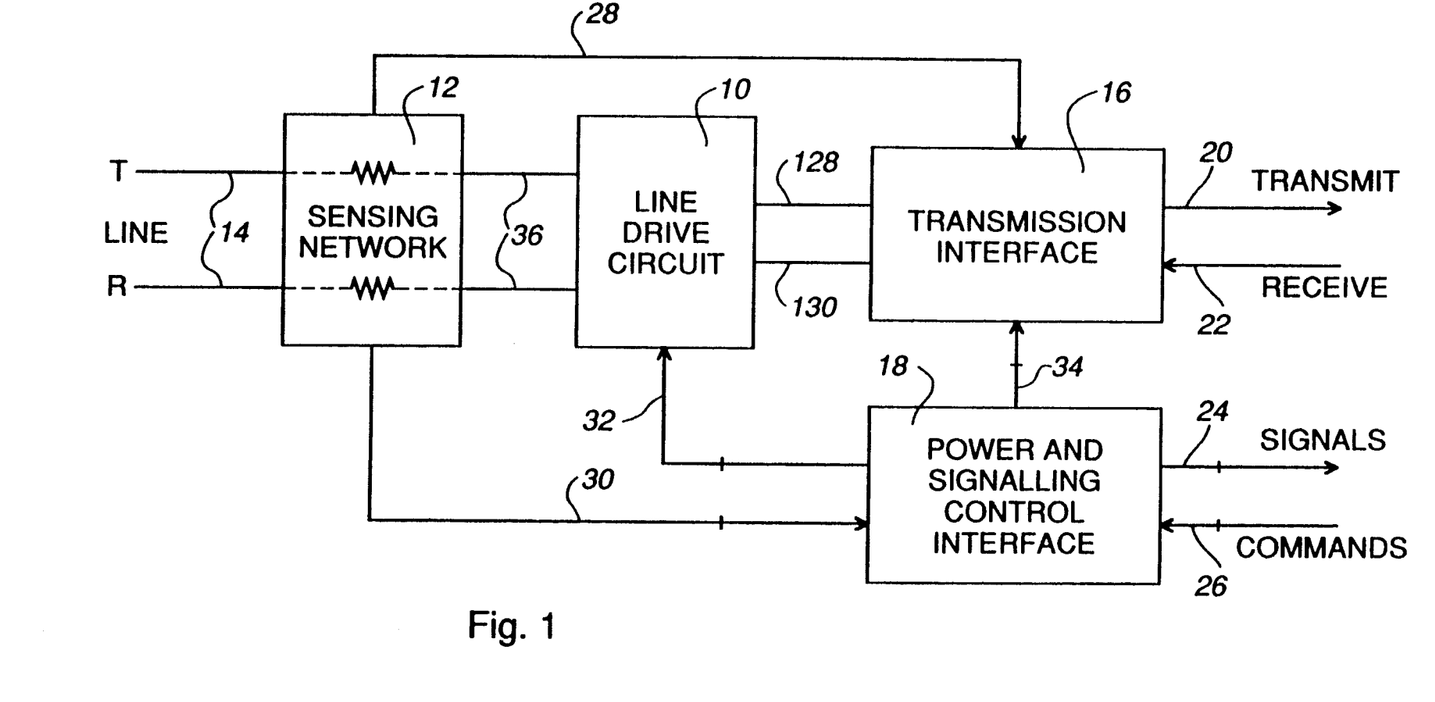
FIG. 1 is a block diagram illustrating components of a programmable telephone line interface circuit.

Referring to FIG. 1, there is illustrated a block diagram showing main components of a programmable telephone line interface circuit, which is assumed in the following description to form part of and be located at a telephone central office (not shown), or CO, but which may alternatively form part of a remote terminal which is coupled to a CO via a multiplexed communications path.

These main components of the line interface circuit comprise a line drive circuit 10, a sensing network 12 via which the line drive circuit 10 is coupled to the tip wire T and the ring wire R of a telephone line 14, a transmission interface 16 which communicates with the remainder of the CO via transmit and receive signal paths 20 and 22 respectively, and a power and signalling control interface 18 which communicates signals to and receives programming commands from other parts of the CO via respective paths 24 and 26 respectively. As further described below, the sensing network 12 supplies sensed current and voltage signals to the interfaces 16 and 18 via paths 28 and 30 respectively, and the interface 18 supplies control and other signals to the line drive circuit 10 and to the transmission interface 16 via paths 32 and 34 respectively. In the drawings, including FIG. 1, where desirable for simplicity and clarity, multiple line paths are represented by a single line with a transverse bar.

The line interface circuit of FIG. 1 is intended to be operable, with appropriate commands, including downloaded programming software, supplied to the interface 18 from the CO and used for control purposes and for setting up the transmission interface 16 in a desired manner, to provide any of a wide range of communications services for any of a wide range of communications equipment (not shown) coupled to the telephone line 14. Accordingly, this single form of the line interface circuit can be used for extensive types of services without any hardware changes, simply by appropriate software control from the CO. This results in substantial commercial benefits, in that only a single design of line interface circuit need be manufactured and installed to provide arbitrary communications services, and the line interface circuit can be easily reconfigured under software control to change the services which it provides.

Examples of communications services which can be provided by the single design of line interface circuit include residential telephone services such as customer local area signalling (CLASS) and call management (CMS) services, multi-party services, and frequency selective ringing; business telephone and data services such as individual line, attendant console, message waiting, coin, ISDN U, and switched voiceband data services; and switched special services such as Centrex lines, WATS lines, and direct dialling.

In order to provide such services, the line interface circuit provides a large number of features through the design and arrangement of the interfaces 16 and 18, including ringing, dial pulse digit collection, loop or ground start, DC feed with current limiting, low power standby, battery reversal, modem transmission, ABCD bit signalling, CLASS and DTMF tone transmission, on-hook and off-hook signalling, and surge protection with automatic recovery. To this end, the transmission interface 16 comprises a digital signal processor and codec (coder-decoder), control software for which is supplied from the CO via the interface 18 and the paths 34. The interface 18 comprises a processor, memory, communications interfaces, and control circuits for controlling the overall functioning of the line interface circuit. Except for parts described below with reference to FIG. 3 of the drawings, these interfaces 16 and 18 are not described further here.

Figure 2:
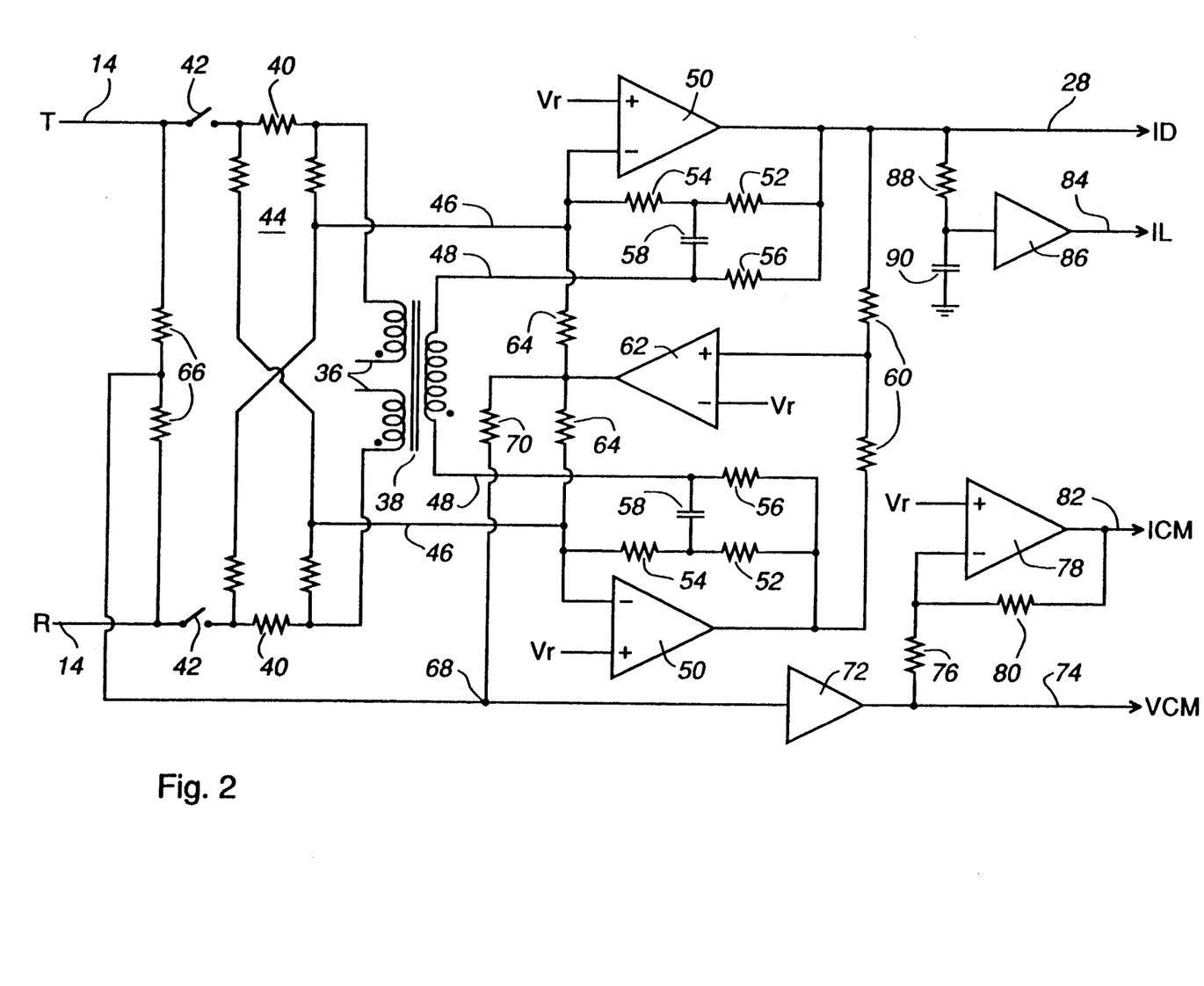
FIGS. 2 and 3 are circuit diagrams illustrating parts of the line interface circuit of FIG. 1.
Figure 3:
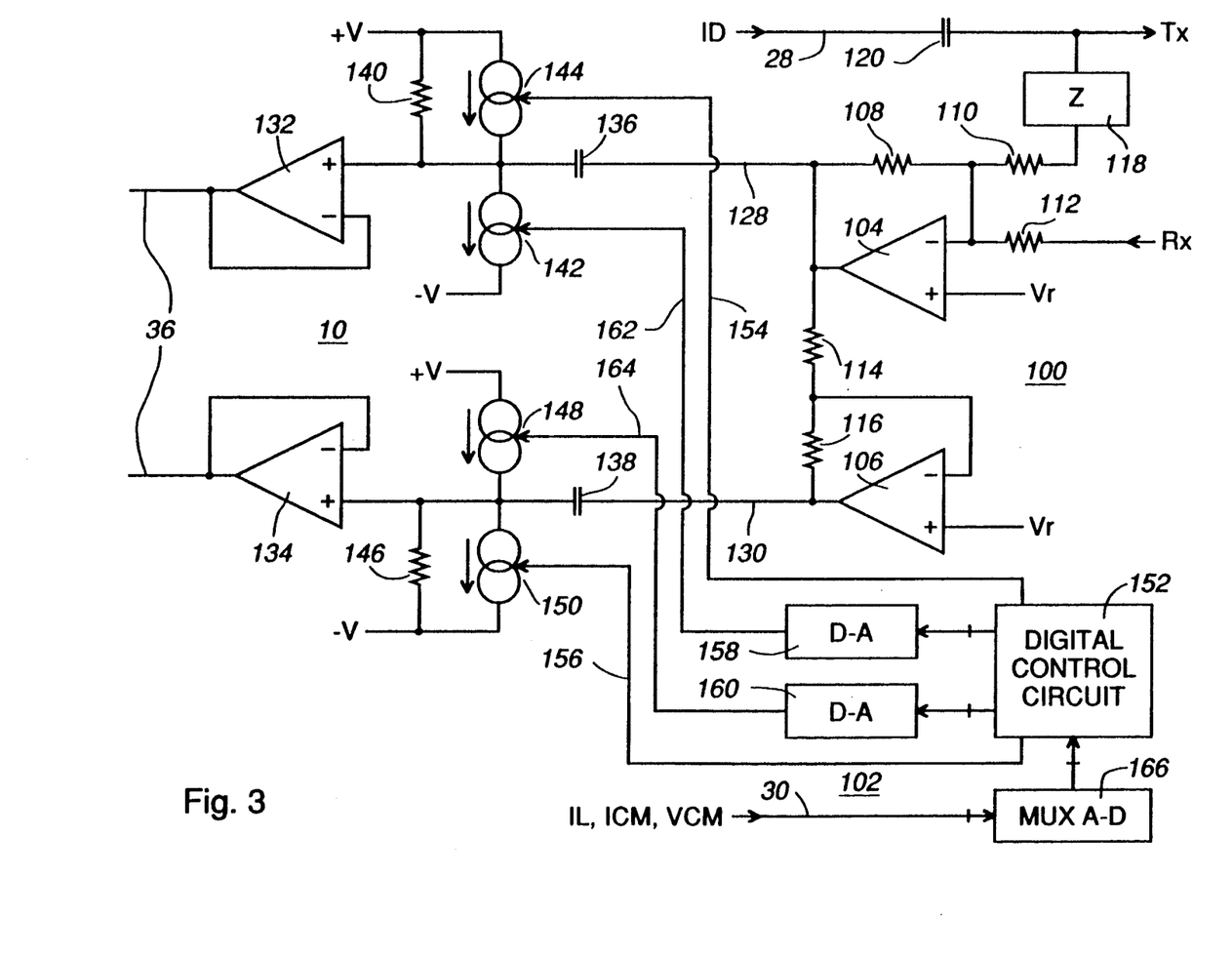

FIG. 2 is a circuit diagram illustrating parts of the sensing network 12, and FIG. 3 is a circuit diagram illustrating the line drive circuit 10 and associated parts of the interfaces 16 and 18. Output lines 36 of the line drive circuit 10, shown at the left-hand side of FIG. 3 and also indicated in FIG. 1, are coupled to the tip and ring wires of the telephone line 14 via the sensing network 12 as already explained above.

Referring to FIG. 2, the wires 36 are coupled to the telephone line tip and ring wires T and R via primary windings, sensed as shown by dots adjacent the windings, of a transformer 38, matched feed resistors 40, and relay contacts 42. A resistor network 44 is connected to the feed resistors 40 to provide on lines 46 a balanced output dependent upon current flowing through the feed resistors 40 and on the telephone line 14. A secondary winding of the transformer 38 provides on lines 48 an output dependent upon the differential alternating current flowing through the primary windings and hence on the telephone line 14.

The two lines 46 are connected to the inverting inputs of respective differential amplifiers 50, whose non-inverting inputs are supplied with a reference potential Vr. For convenience, the label Vr is used commonly at various places in FIGS. 2 and 3 to denote a reference potential, for example half the supply voltage, but it should be understood that different actual values of reference potential can be provided at different ones of these places to provide desired operating conditions. The output of one of the amplifiers 50 as shown (or alternatively the differential outputs of the two amplifiers 50) constitutes a signal ID on the line 28. This signal ID represents the differential current on the telephone line 14, and is supplied to the transmission interface 16 as already described.

Each of the amplifiers 50 has a d.c. feedback path from its output to its inverting input via two series-connected resistors 52 and 54, and an a.c. feedback path from its output to its inverting input via a series-connected resistor 56 and capacitor 58 connected to the junction between the resistors 52 and 54. Each line 48 from the secondary winding of the transformer 38 is connected to a respective junction between the resistor 56 and capacitor 58.

A potential divider is formed by two resistors 60 connected in series between the outputs of the amplifiers 50, the junction between these resistors being connected to the non-inverting input of an amplifier 62 whose inverting input is supplied with a reference potential Vr. The output of the amplifier 62 is coupled via respective resistors 64 to the two lines 46.

Another potential divider is formed by two resistors 66 connected in series between the tip and ring wires T and R of the telephone line 14, on the line side of the relay contacts 42. The junction between these resistors 66 is connected to a summing node 68, to which the output of the amplifier 62 is connected via a resistor 70. The summing node 68 is connected to the input of a buffer amplifier 72, whose output can constitute a common mode voltage signal VCM on a line 74 which constitutes one of the paths 30 in FIG. 1.

The line 74 is also connected via a resistor 76 to the inverting input of a differential amplifier 78, whose non-inverting input is supplied with a reference potential Vr and whose output, which is connected via a feedback resistor 80 to the inverting input, is a common mode current signal ICM on a line 82 constituting another of the paths 30. A further one of the paths 30 is constituted by a line 84 carrying a loop current signal IL from the output of a buffer amplifier 86. The input of the buffer amplifier 86 is connected via a resistor 88 to the line 28 and via a capacitor 90 to ground, the resistor 88 and capacitor 90 together forming a low pass filter with a corner frequency of about 200 Hz.

The arrangement of the transformer 38, feed resistors 40, and resistor network 44 as described above and illustrated in FIG. 2 is known for example from U.S. Pat. No. 4,484,032 already referred to. This arrangement allows precise longitudinal balance of the circuit to be achieved, using a very small transformer as the transformer 38 for a.c. sensing, and using resistors matched to ordinary tolerances (for example 1%) for the feed resistors 40 and resistor network 44. High resistance values used in the resistor network 44 reduce power consumption during idle conditions (on-hook state of a telephone connected to the line 14), and the transformer facilitates good noise performance and a bandwidth independent of the resistor values used.

As described and illustrated in U.S. Pat. No. 4,484,032, one terminal of the secondary winding of the transformer is grounded, and the other terminal is capacitively coupled to the inverting input of a differential amplifier having a.c. and d.c. feedback paths. The non-inverting input of the differential amplifier forms a ground reference for the amplifier, whose gain is determined by the ratio of an a.c. feedback resistance (96 in FIG. 3 of the patent) to the resistance of the secondary winding of the transformer. As the latter is desirably small, this gain is relatively large. Any potential difference between the grounded terminal of the transformer secondary winding and the ground reference at the non-inverting input of the amplifier constitutes a noise source, which is amplified by this large gain. Especially where the amplifier is implemented in an integrated circuit, as is desirable for economy and small size, such a potential difference and consequent noise is difficult to avoid.

This disadvantage is avoided by the use in the circuit of FIG. 2 of the two amplifiers 50 in a balanced configuration. The amplifiers 50 operate with opposite phase symmetrically about the reference potential Vr supplied to their non-inverting inputs, which determines the potential of the lines 46, so that susceptibility to differential ground noise as in the prior art is eliminated.

This arrangement has the advantage, compared with the multi-stage cascaded amplifiers of U.S. Pat. No. 4,764,956 already referred to, that only a single stage of amplification (split between the two balanced amplifiers 50) is used to provide a differential mode output signal, and no compensation scheme is necessary as in that patent because of the balanced or symmetrical arrangement of the amplifiers 50. This arrangement thus provides less phase shift, and hence more stable operation over a greater bandwidth, than this prior art.

As in the prior art represented in FIG. 3 of U.S. Pat. No. 4,484,032, the a.c. and d.c. feedback paths of the sensing amplifiers 50 are arranged to provide the same gain for a.c. signals as at d.c. In the prior art, the secondary winding of the transformer is coupled to the inverting input of the sensing amplifier via only a coupling capacitor which forms part of the a.c. feedback path of the amplifier. However, because the transformer secondary winding has a finite resistance, there is a voltage drop across the coupling capacitor which in turn causes a variation in gain and phase in the transition between d.c. and a.c. signals. This can give rise to distortion of low frequency a.c. or pulsed d.c. signals, such as dial pulses, or to instability when the output of the amplifier is used in a feedback loop for d.c. control purposes.

This problem of the prior art is avoided in the circuit arrangement of FIG. 2 by the provision of the resistors 54, one for each of the amplifiers 50 in view of the balanced arrangement. To understand this, it can be seen that the outputs of the amplifiers 50 swing in a balanced manner and with opposite phase about the reference potential Vr applied to the non-inverting inputs, so that the mid-point of the transformer secondary winding is at this reference potential and hence at the same potential as the lines 46. For each side of the balanced arrangement, the coupling capacitor 58 is connected between the tapping points of two potential dividers between the output of the amplifier 50 and the reference potential Vr, one formed by half the resistance of the secondary winding in series with the resistor 56, and the other formed by the resistors 54 and 52. By making the ratio of these two potential dividers equal, there is no net voltage across the capacitor 58, resulting in a more uniform amplifier response in the transition from d.c. to a.c. signals.

In other words, expressing the resistance of the resistors 52, 54, and 56 and the transformer secondary winding as R52, R54, R56, and Rw respectively, the resistance values are selected so that $R54 = Rw \times R52/2 \times R56$. However, it should also be appreciated that this relationship may be modified if desired to control the transition of the amplifier response between d.c. and a.c. signals, for example by over-compensating for the transformer winding resistance to provide, with a desired capacitance of the capacitor 58, an attenuation at a frequency of 60 Hz.

The amplifier 62 serves to reduce common mode signals on the lines 46, through the coupling of its output to these lines via the resistors 64, in a similar manner to that of the prior art except that, in view of the balanced arrangement of the circuit, the non-inverting input of the amplifier 62 is connected to the tapping point of the potential divider formed by the resistors 60 connected between the outputs of the amplifiers 50, and the inverting input of the amplifier 62 is connected to a reference potential Vr.

In order to determine all of the currents on the telephone line 14, it is necessary to monitor the common mode current on the telephone line as well as the differential current, represented by the signal ID, or the loop current, represented by the signal IL. The loop current signal IL is produced on the line 84 from the differential current signal ID by filtering in the low-pass filter constituted by the resistor 88 and capacitor 90 and buffering in the buffer amplifier 86. The low-pass filtering attenuates frequency components above about 200 Hz, so that the signal IL represents the d.c. loop current. The currents on the tip and ring wires of the telephone line are respectively the sum and difference of the common mode current and the loop current.

The output voltage of the amplifier 62 is $(-VT-VR+Icm \times R40) \times R64/R44$, where VT and VR are the voltages of respectively the tip and ring wires T and R of the telephone line 14, Icm is the common mode current through the feed resistors 40, R40 and R64 are the resistances of each of the resistors 40 and 64 respectively, and R44 is the resistance of each of the resistors in the resistor network 44. At the summing node 68, this output voltage is summed with a voltage derived from the potential divider formed by the resistors 66 and which is dependent upon the common mode voltage and not on the common mode current. This voltage is given by $(VT+VR) \times R70/R66$, where R70 and R66 are the resistances of the resistor 70 and each resistance 66, respectively. The resistance values are selected so that $R66/R70=R44/R64$, whereby at the summing node 68 the summed voltage is independent of the common mode voltage component $VT+VR$, and represents only the common mode current. This summed voltage at the node 68 is buffered by the buffer amplifier 72 and amplified by the amplifier 78, whose gain is determined by the resistors 76 and 80, to provide the signal ICM on the line 82 representing, with a desired sensitivity, the common mode current on the line 14.

When the relay contacts 42 are opened for example for protection of the line interface circuit, the common mode current through the feed resistors 40 becomes zero. The output voltage of the amplifier 62 then represents only the sum of the drive voltage levels provided by the line drive circuit 10 as described further below, while the common mode voltage on the telephone line 14 continues to be monitored via the resistors 66. Accordingly, the summing node 68 in this situation is at a summed voltage representing the common mode voltage on the line 14 referenced to the sum of the drive voltage levels. This summed voltage, buffered by the buffer amplifier 72, constitutes the common mode voltage signal VCM on the line 74. Thus common mode voltages on the line 14 are monitored when the relay contacts 42 are open.

Referring now to FIG. 3, there is illustrated a circuit diagram of the line drive circuit 10 together with a signal coupling circuit 100, which can be considered to form part of the transmission interface 16 in FIG. 1, and control circuitry 102, which can be considered to be part of the power and signalling control interface 18 in FIG. 1.

The signal coupling circuit 100 comprises two differential amplifiers 104 and 106, resistors evenly numbered from 108 to 116, an impedance (Z) 118, and a capacitor 120. The impedance 118 can comprise fixed or switched reactive components as is known in the prior art, but for full versatility of the line interface circuit is preferably a programmable impedance of the form described and claimed in the simultaneously filed application entitled "Impedance Generator For A Telephone Line Interface Circuit" already referred to.

The differential current signal ID on the line 28, coupled via the capacitor 120, constitutes a transmit path signal Tx and is also fed back to the inverting input of the amplifier 104 via the impedance 118 and the resistor 110. A receive path signal Rx is coupled to the inverting input of the amplifier 104 via the resistor 112. The amplifier 104 has its non-inverting input coupled to a reference potential Vr, and has a feedback path including the resistor 108 from its output to its inverting input. The resistor 108 determines, with the resistors 112 and 110, the gain of the amplifier 104 respectively for the receive path signal Rx and for the signal fed back via the impedance 118.

The output of the amplifier 104 is supplied on a line 128 to the line drive circuit 10. The resistors 114 and 116 and the amplifier 106 together form a unity gain inverter which inverts this output and produces a complementary output on a line 130 to the line drive cirvuit. The lines 128 and 130 are also referenced in FIG. 1.

The d.c. blocking of the signal ID by the capacitor 120 results in the impedance 118 and the amplifiers 104 and 106 having to accommodate only the relatively low voltage signals being transmitted and received, and not larger d.c. components which may exist on the telephone line 14. Consequently, the amplifiers 104 and 106 can be designed to have a large bandwidth as is desired, with the amplifier 104 still providing a significant gain.

The line drive circuit 10 comprises two d.c. buffer amplifiers 132 and 134 whose outputs are connected to the wires 36 on respectively tip wire and ring wire sides of the line drive circuit. The outputs of the amplifiers 132 and 134 are also connected directly to the inverting inputs of the amplifiers, respectively, to provide unity gain so that these amplifiers have a maximum bandwidth and a minimum output impedance. The line 128 is a.c. coupled to the non-inverting input of the amplifier 132 via a capacitor 136, and the line 130 is a.c. coupled to the non-inverting input of the amplifier 134 via a capacitor 138.

It is observed that the amplifiers 132 and 134 need not necessarily have a gain of exactly unity as described here and as illustrated in FIG. 3. They may alternatively provide a desired gain, providing a proportional relationship between the d.c. potentials at their inputs and outputs. However, as any such gain decreases the bandwidth and increases the output impedance of the amplifiers, it is desirably kept small and approximates to a gain of unity.

The non-inverting input of the amplifier 132 is also coupled via a resistor 140 to a supply voltage $+V$, and via a controlled current source 142 to a supply voltage $-V$. It is also coupled to the supply voltage $+V$ via a switched current source 144, in parallel with the resistor 140. Conversely, the non-inverting input of the amplifier 134 is also coupled via a resistor 146 to the supply voltage $-V$, and via a controlled current source 148 to the supply voltage $+V$. It is also coupled to the supply voltage $-V$ via a switched current source 150, in parallel with the resistor 146. The supply voltages $+V$ and $-V$ may conveniently be the CO battery voltages of ground and $-48$ volts respectively, and this is assumed in the following description, but othe voltages may be used if desired.

Currents passed by the current sources 142, 144, 148, and 150 are controlled by a digital control circuit 152 which forms part of the control circuitry 102. The switched current sources 144 and 150 are controlled via lines 154 and 156 respectively simply to be on or off as further described below; these sources can alternatively be replaced by switched resistors. The controlled current sources 142 and 148 are precisely controlled by eight-bit digital signals supplied by the digital control circuit 152 to digital-to-analog converters 158 and 160 respectively, and thence by stepped analog signals on lines 162 and 164 respectively. The lines 154, 156, 162, and 164 constitute the paths 34 in FIG. 1.

The signals IL, ICM and VCM on the paths 30 are supplied to inputs of a multiplexed analog-to-digital converter 166, whose digital outputs are supplied to the digital control circuit 152. The digital control circuit is also supplied, as already explained with reference to FIG. 1, with commands in accordance with which it determines appropriate operating conditions for the remainder of the line interface circuit and provides control signals accordingly. As part of this control, the digital control circuit 152, which for example is constituted by a digital state machine, monitors the digitized signals IL, ICM, and VCM to detect (possibly faulty or undesired) operating conditions some of which are discussed further below, and instigates action to adapt the line interface circuit in relation to such conditions. This action may in particular include control of the current sources as described below, and control of the relay contacts 42 for protection of the line interface circuit.

By way of example, it is observed that the resistors 140 and 146 may have resistances of about 320 kΩ, the switched current sources 144 and 150 may pass a current of either 0 or 10 mA, the controlled current sources 142 and 148 may pass a precisely controlled current in a range from 0 to 150 μA, and the capacitors 136 and 138 may have capacitances of about 0.22 μF.

Because the capacitor 136 blocks d.c., the d.c. voltage level at the non-inverting input of the amplifier 132 is determined by the supply voltages +V and −V, the resistance of the resistor 140, and the controlled currents passed by the current sources 142 and 144. Similarly, the d.c. voltage level at the non-inverting input of the amplifier 134 is determined by the supply voltages +V and −V, the resistance of the resistor 146, and the controlled currents passed by the current sources 148 and 150. The amplifiers 132 and 134 are d.c. amplifiers having a desired large bandwidth, unity gain as described above, and a large d.c. voltage range, so that the d.c. voltage levels at their non-inverting inputs determine the d.c. voltage levels at their outputs and on the wires 36, and hence on the tip and ring wires T and R of the telephone line 14.

Considering the tip side of the line drive circuit, the current source 144 is normally off so that it passes no current. The controlled current source 142 is controlled, for example in 256 discrete steps determined by the 8-bit output from the digital control circuit 152 to the digital-to-analog converter 158, to pass any desired current in the range from 0 to 150 μA. This current flows through the resistor 140, which accordingly drops a voltage dependent upon the current and which can be from zero to the difference between the supply voltages +V and −V. Accordingly, the control of the controlled current source 142 enables the d.c. voltage at the non-inverting input of the amplifier 132, and hence on the tip wire T, to be steered to any desired level from +V to −V. With the resistor 140 having a resistance of 320 kΩ and the supply voltages +V and −V being ground (0 volts) and −48 volts as indicated above, the tip wire T can be set to any desired voltage from 0 to −48 volts.

Similarly, on the ring side of the line drive circuit the current source 150 normally passes no current, and the controlled current source 148 can be controlled via the converter 160 to pass any current from 0 to 150 μA to drop a voltage from 0 to 48 volts across the resistor 146, so that the non-inverting input of the amplifier 134, and hence the ring wire R, can be steered to any voltage from −48 to 0 volts. It should be noted that the settings of the d.c. voltage level of the tip and ring wires T and R are independent of one another, so that each wire can be set to any voltage in the desired range between the supply voltages +V and −V. It should also be noted that the connections of the resistors 140 and 146 to the supply voltages +V and −V respectively enables the most common situation, of these voltages being applied to the tip and ring wires respectively, to be provided with the minimum power consumption.

The current sources have a high impedance, so that they do not adversely affect the capacitive coupling of a.c. signals from the outputs of the amplifiers 104 and 106 to the amplifiers 132 and 134 respectively. The amplifiers 104 and 106 have low output impedances, so that the resistors 140 and capacitor 136, and likewise the resistor 146 and capacitor 138, from low pass filters each with a pole at a sufficiently low frequency, for example about 3.5 Hz, to filter out any residual a.c. noise on the d.c. control signal lines 162 and 164. This low pass filtering action is also of particular benefit in the normal course of operation in changing the d.c. voltage levels, because it smooths or filters out the discrete steps as the d.c. voltage level is changed so that there is no degradation of transmission performance.

As a result of the filtering action, when the current passed by the controlled current source 142 is reduced, the tip voltage set at the non-inverting input of the amplifier 132 will become more positive at a relatively slow rate determined by the time constant (about 70 ms) of the resistor 140 and the capacitor 136. While such a slow rate of change is desirable for some operating situations of the line interface circuit, a faster rate of change is desirable in other situations. Where a fast rate of change is desired, the switched current source 144 is turned on, under the control of the digital control circuit 152 via the line 154, for a short period determined by the digital control circuit, to discharge the capacitor 136 at the higher current, for example 10 mA, passed by the current source 144. Similarly, the switched current source 150 is turned on by the digital control circuit 152 via the line 156 to make the ring voltage level more negative at a faster rate than is permitted by the time constant of the resistor 146 and capacitor 138.

The independent control of the d.c. voltage levels on the tip and ring wires as described above is useful for a variety of purposes, during normal operation, for protection against faults, and for self-testing of the line interface circuit. For example, in normal operation this independent control enables battery reversal conditions, for example for signalling purposes, to be set up without using a relay. In addition, the d.c. voltage applied to the telephone line can be set in dependence upon the loop current signal II supplied to the digital control circuit 152 in order to limit the loop current to a desirable low level, whereby power consumption is reduced and the line interface circuit is adaptively adjusted for different loop resistances. For protection purposes, for example in the case of a ground fault (ring wire shorted to ground) the voltage level of the ring wire can be changed towards 0 volts to limit current during the fault.

It should be appreciated in this respect that the provision of both the loop current signal IL and the common mode current signal ICM to the digital control circuit 152 enables this circuit to determine both the tip wire current (common mode current + loop current) and the ring wire current (common mode current − loop current), so that the d.c. voltage levels supplied to the tip and ring wires can be individually determined in relation to the tip and ring wire currents.

Although a particular embodiment of the invention has been described in detail, it should be appreciated that numerous modifications, variations, and adaptations may be made without departing from the scope of the invention as defined in the claims.

What is claimed is:

1. A line interface circuit for a two-wire telecommunications line, comprising:

d.c. feed means including two feed resistors and a transformer having two primary windings in series with the feed resistors for connection to the two wires of the line, respectively;

current sensing means coupled to the feed resistors for providing on a pair of wires a balanced output dependent upon current flowing through the feed resistors; and two differential amplifiers in a balanced arrangement, each amplifier having an inverting input, a non-inverting input, and an output for providing a signal dependent upon differential current through the feed resistors, one of the inputs of each amplifier being d.c. coupled to a respective one of the pair of wires and the other of the inputs of each amplifier being d.c. coupled to a point of reference potential, each amplifier having d.c. and a.c. feedback paths from its output to its inverting input, and the inverting input of each amplifier being a.c. coupled to a respective end of a secondary winding of the transformer.

2. A line interface circuit as claimed in claim 1 wherein, for each amplifier, the d.c. feedback path comprises a d.c. feedback resistance between the output and the inverting input of the amplifier, the a.c. feedback path comprises an a.c. feedback resistor coupled to the output of the amplifier in series with a capacitor coupled to the inverting input of the amplifier, and the respective end of the secondary winding of the transformer is coupled to a junction between the a.c. feedback resistor and the capacitor.

3. A line interface circuit as claimed in claim 2 wherein, for each amplifier, the d.c. feedback resistance comprises a first resistor connected to the output of the amplifier in series with a second resistor connected to the inverting input of the amplifier, the capacitor is connected to a junction between the first and second resistors whereby the a.c. feedback path comprises the a.c. feedback resistor, the capacitor, and the second resistor in series, and a ratio of the resistance of the second resistor to the resistance of the first resistor is approximately equal to a ratio of half the resistance of the secondary winding of the transformer to the resistance of the a.c. feedback resistor.

4. A line interface circuit as claimed in claim 3 wherein, for each amplifier, the inverting input is connected to the respective one of the pair of wires and the non-inverting input is connected to the point of reference potential.

5. A line interface circuit as claimed in claim 4 and including a potential divider connected between the outputs of the two differential amplifiers, a further amplifier having inverting and non-inverting inputs connected respectively to a point of reference potential and to a tapping point of the potential divider, and two resistors each connected between an output of the further amplifier and a respective one of the pair of wires.

6. A line interface circuit as claimed in claim 5 and including a resistor connected between the output of the further amplifier and a summing node, and a potential divider arranged to be connected between the wires of the telecommunications line and having a tapping point connected to the summing node, the arrangement being such that a common mode voltage component at the output of the further amplifier is cancelled at the summing node to produce a signal representing common mode current through the feed resistors.

7. A line interface circuit as claimed in claim 6 and including switching means for coupling the telecommunications line to the d.c. feed means, the potential divider which has the tapping point connected to the summing node being connected on a line side of the switching means whereby a signal produced at the summing node when the switching means is open represents common mode voltage on the line.

8. A line interface circuit as claimed in claim 1 and including a potential divider connected between the outputs of the two differential amplifiers, a further amplifier having differential inputs connected respectively to a point of reference potential and to a tapping point of the potential divider, and two resistors each connected between an output of the further amplifier and a respective one of the pair of wires, the arrangement being such as to reduce common mode signals at the inputs and outputs of the two differential amplifiers.

9. A line interface circuit as claimed in claim 8 and including a resistor connected between the output of the further amplifier and a summing node, and a potential divider arranged to be connected between the wires of the telecommunications line and having a tapping point connected to the summing node, the arrangement being such that a common mode voltage component at the output of the further amplifier is cancelled at the summing node to produce a signal representing common mode current through the feed resistors.

10. A line interface circuit as claimed in claim 9 and including switching means for coupling the telecommunications line to the d.c. feed means, the potential divider which has the tapping point connected to the summing node being connected on a line side of the switching means whereby a signal produced at the summing node when the switching means is open represents common mode voltage on the line.

11. A line interface circuit as claimed in claim 2 and including a potential divider connected between the outputs of the two differential amplifiers, a further amplifier having differential inputs connected respectively to a point of reference potential and to a tapping point of the potential divider, and two resistors each connected between an output of the further amplifier and a respective one of the pair of wires, the arrangement being such as to reduce common mode signals at the inputs and outputs of the two differential amplifiers.

12. A line interface circuit as claimed in claim 11 and including a resistor connected between the output of the further amplifier and a summing node, and a potential divider arranged to be connected between the wires of the telecommunication line and having a tapping point connected to the summing node, the arrangement being such that a common mode voltage component at the output of the further amplifier is cancelled at the summing node to produce a signal representing common mode current through the feed resistors.

13. A line interface circuit as claimed in claim 12 and including switching means for coupling the telecommunication line to the d.c. feed means, the potential divider which has the tapping point connected to the summing node being connected on a line side of the switching means whereby a signal produced at the summing node when the switching means is open represents common mode voltage on the line.

14. A line interface circuit for two-wire telecommunications line, comprising:
- d.c. feed means including two feed resistors and a transformer having two primary windings in series with the feed resistors for connection to the two wires of the line, respectively;
- current sensing means coupled to the feed resistors for providing an output dependent upon current flowing through the feed resistors; and
- differential amplifying means having an output for providing a signal dependent upon differential current through the feed resistors, an input d.c. coupled to the output of the current sensing means, a d.c. feedback path comprising a first resistor connected to the output of the amplifying means in series with a second resistor connected to the input of the amplifying means, and an a.c. feedback path including an a.c. feedback resistor coupled to the output of the amplifying means in series with a capacitor coupled to a junction between the first and second resistors;
- wherein a secondary winding of the transformer is coupled to a junction between the a.c. feedback resistor and the capacitor, and wherein resistances of the first, second, and a.c. feedback resistors are determined in relation to a resistance of the secondary winding of the transformer to produce substantially zero voltage across the capacitor.

15. A line interface circuit as claimed in claim 14 and including an amplifier having an input coupled to the output of the differential amplifying means and having an output coupled to the input of the differential amplifying means for reducing common mode signals at the output of the differential amplifying means.

16. A line interface circuit as claimed in claim 15 and including a resistor connected between the output of the amplifier and a summing node, and a potential divider arranged to be connected between the wires of the telecommunications line and having a tapping point connected to the summing node, the arrangement being such that a common mode voltage component at the output of the amplifier is cancelled at the summing node to produce a signal representing common mode current through the feed resistors.

17. A line interface circuit as claimed in claim 16 and including switching means for coupling the telecommunications line to the d.c. feed means, the potential divider being connected on a line side of the switching means whereby a signal produced at the summing node when the switching means is open represents common mode voltage on the line.

18. A line interface circuit for a two-wire telecommunications line, comprising:
- d.c. feed means including two feed resistors and a transformer having two primary windings in series with the feed resistors for connection to the two wires of the line, respectively;
- current sensing means coupled to the feed resistors for providing an output dependent upon current flowing through the feed resistors;
- amplifying means having an input coupled to the output of the current sensing means and to a secondary winding of the transformer and having an output providing a signal dependent upon differential current through the feed resistors;
- an amplifier having an input coupled to the output of the amplifying means and having an output coupled to the input of the amplifying means for reducing common mode signals at the input and output of the amplifying means;
- a resistor connected between the output of the amplifier and a summing node; and
- a potential divider arranged to be connected between the two wires of the line and having a tapping point connected to the summing node, the arrangement being such that a common mode voltage component at the output of the amplifier is cancelled at the summing node to produce a signal representing common mode current through the feed resistors.

19. A line interface circuit as claimed in claim 18 and including switching means for coupling the telecommunications line to the d.c. feed means, the potential divider being connected on a line side of the switching means whereby a signal produced at the summing node when the switching means is open represents common mode voltage on the line.

* * * * *